United States Patent [19]
Bartel

[11] Patent Number: 5,762,384
[45] Date of Patent: Jun. 9, 1998

[54] VEHICLE DOOR LOCK WITH A CENTRALLY-OPERATED LOCKING UNIT

[75] Inventor: Peter Bartel, Hattingen, Germany

[73] Assignee: Kiekert AG, Heiligenhaus, Germany

[21] Appl. No.: 736,923

[22] Filed: Oct. 25, 1996

[30] Foreign Application Priority Data

Oct. 26, 1995 [DE] Germany ............... 195 39 753.3

[51] Int. Cl.$^6$ ................................................. E05C 3/16
[52] U.S. Cl. ................ 292/216; 292/201; 292/DIG. 27; 318/685
[58] Field of Search ............... 292/216, DIG. 27, 292/201, DIG. 23, DIG. 3; 70/264, 279; 318/685, 696

[56] References Cited

U.S. PATENT DOCUMENTS

| | | |
|---|---|---|
| 4,735,447 | 4/1988 | Kleefeldt . |
| 4,974,886 | 12/1990 | Kleefeldt et al. ............ 292/216 X |
| 5,656,899 | 8/1997 | Kuroda ........................ 292/201 X |
| 5,667,260 | 9/1997 | Weyerstall ................... 292/DIG. 27 |
| 5,680,783 | 10/1997 | Kuroda ........................ 292/DIG. 23 |

FOREIGN PATENT DOCUMENTS

| | | |
|---|---|---|
| 0 654 892 | 5/1995 | European Pat. Off. . |
| 35 26 501 | 2/1987 | Germany . |
| 39 02 776 | 2/1990 | Germany . |
| 43 07 523 | 9/1994 | Germany . |
| 44 27 253 | 2/1996 | Germany . |
| 43 38 548 | 5/1996 | Germany . |
| 1-243889 | 9/1989 | Japan ............................ 318/685 |
| 1551822 | 9/1979 | United Kingdom ............. 318/685 |

OTHER PUBLICATIONS

Boinodiris, Light–Emitting Diode/Stepper Motor Shutoff Control Circuitry, IBM Tech. Discl. Bulletin, vol. 18 No. 9, pp. 2759–2760, Feb. 1976.

Veillette, Smart Circuit Boosts Stepper Precision, Machine Design vol. 50, No. 17, pp. 84–85, Jul. 1978.

"Saia Schrittmotoren" Ausgabe 17/21 D1; pp. 1–57.

*Primary Examiner*—Rodney M. Lindsey
*Attorney, Agent, or Firm*—Herbert Dubno

[57] ABSTRACT

A vehicle door lock having a closing element component, a locking element component and an actuating element component, the latter having a component actuating element and a securing actuating element, is connected to a central locking unit for remote controlled actuation of the securing actuation element. The actuation is effected with an electric motor and, in addition, a position monitoring is provided. The electric motor, for drive by the central locking unit is a reversible polyphase stepping motor with a phase confirming stator winding and which acts via a transmission on the lock component. The locking component is designed for a drive power which is greater than the nominal power of the polyphase stepping motor when it is permanently energized. The stepping motor is driven with a working voltage which is greater than the design voltage corresponding to the drive power for the centrally operable unit. For the position monitoring, a step monitor system is used. The polyphase stepping motor is controlled with the aid of a computer.

5 Claims, 5 Drawing Sheets

VEHICLE DOOR LOCK WITH A CENTRALLY-OPERATED LOCKING UNIT

FIELD OF THE INVENTION

My present invention relates to a door lock, especially for a motor vehicle and, more particularly, to a motor vehicle door lock of the type having an electric motor controlled by a central locking unit of the vehicle lock system. More particularly, the invention is an improvement upon a three-part vehicle-door latch of the type described in U.S. Pat. No. 4,735,447.

BACKGROUND OF THE INVENTION

A motor vehicle door latch or door lock can comprise a closure element component, a locking element component and an actuating element component, the latter comprising an opening actuating element as well as a security actuating element. The securing actuating element is remotely controlled by the central locking unit and is driven by an electric motor and provided with a position monitoring device. The central locking unit is controlled by means of a mechanical or electronic key or with the aid of switches. The electric motor is connected to the vehicle battery. Position monitoring means that the various positions of the securing actuating element are interrogated and monitored.

Usually the operation of the driver's side door lock by a key or remote control switch will, via the central locking unit, signal the electric motors of all of the door locks to shift an antitheft or securing actuating element from its antitheft or secure position to its "off" position. The elements which are associated with the above-described components will be further detailed below.

In a door lock of the aforedescribed type (see U.S. Pat. No. 4,735,447 as well as DE 35 26 501 Cl, DE 39 02 776 C2 and DE 43 07 523 A1) the electric motors are direct-current motors and especially reversible electric motors. The motors are energized to provide the various functions of the motor vehicle door lock, for example, the lock/unlock state, the antitheft/nonantitheft states, etc. and correspondingly displace the elements of the respective components. Signal generators, e.g. in the form of limit switches or sensors, can be provided to transmit to an electronic computer the positions reached of the elements. The computer itself controls the energization of the motor and may be the central locking unit.

The operational reliability depends upon the signal generators which must be designed for the level of precision required. This is, of course, costly. The signal issuance can also arise from a contact of one or more elements of the respective components against a mechanical abutment in the motor vehicle door lock.

The engagement of a moving element of a component against a mechanical stop can result, in the case of direct-current motors, in a current peak resulting from blocked travel and which can be evaluated as a position signal. The blocked travel current peak can give rise to electromagnetic overloading of the motor which must be considered in the selection and design of the motor.

Basically it is known to provide electric stepping motors controlled by computers for the positioning devices in motor vehicles (see DE 43 38 548). Efforts have been taken in the past to allow a very precise positioning of the adjustment device based upon the set point value previously in force. The nominal power or rated power of the stepping motor generally corresponds to the maximum to which the motor is to be exposed. Overstepping of the nominal or rated power does not occur. Furthermore, because of the high nominal power which must be chosen, correspondingly expensive stepping motors must be used.

OBJECTS OF THE INVENTION

It is, therefore, the principal object of the present invention to provide a motor vehicle door lock of the aforedescribed basic construction which can be driven more simply from the central locking system unit than has hitherto been the case without interfering with the reliability or precision of operation of the vehicle door lock.

Another object of this invention is to provide an improved door lock system which can utilize smaller-dimensioned motors without interfering with operational reliability.

Still another object of the invention is to provide a motor vehicle door lock with an operating motor which can overcome drawbacks of earlier systems.

SUMMARY OF THE INVENTION

These objects and others which will become apparent hereinafter are attained, in accordance with the invention in a motor vehicle door lock (which can be operated by a central lock unit and which can form part of a central lock system as described) with a closure element assembly or component, a locking element assembly or component and an actuating element assembly or component which has opening actuation elements and securing actuation elements and in which a centrally-operably locking device can be provided for remotely controlled actuation of the securing actuating element.

According to the invention, this centrally-operated unit which can include the motor, the speed-reduction gearing and the main securing element shiftable between antitheft (secure) and nonsecured positions, is driven by an electric motor and the electric motor is a reversible polyphase stepping motor having a phase conforming stator winding and acts upon the centrally-operated elements via a step-down transmission or gearing. The polyphase stepping motor has a design nominal power or rated power $L_N$ at its output when permanently energized. However, in practice that stepping motor is not continuously energized but rather is energized by stepping pulses from a computer and (e.g. of the central locking unit) acts upon the centrally-operable unit (i.e. the mechanism driven by the motor) which requires, for its operation, a drive power $L_{ANZ}$ which is greater than the nominal or rated power $L_N$ of the polyphase stepping motor. The stepping pulses are applied at a working voltage $U_{AR}$, however, which is greater than the design voltage $U_{AU}$ which would correspond to the drive power of the centrally-operable element. The position monitoring is effected by step-monitoring of this motor and the stepping of the motor including the step monitoring can be effected via a computer, e.g. the computer of the central lock unit.

More particularly the motor vehicle door lock of the invention can comprise:

a closure-element component provided with a pivotable bolt engageable with a door-frame pin and a keeper for the bolt;

a locking-element component operatively connected with the closure elements;

an actuating-element component comprised of opening actuation elements and of a securing actuation element which can include a main element shiftable between antitheft (secure) and nonsecured positions;

a polyphase reversible stepping motor having a phase-conforming stator winding and provided with a step-down transmission operatively connected to the main element for operating same in response to a signal from a remote source, the motor, the step-down transmission and the main element forming a centrally operable unit operable by the computer of a central lock unit of the central lock system of which the door lock is a part, the polyphase reversible stepping motor being designed to have a certain nominal power $L_N$ at an output of the polyphase stepping motor under constant energization, the centrally operable unit being designed to require a drive power $L_{ANZ}$ greater than the nominal power $L_N$ of the polyphase stepping motor whereby $L_N$ is less than $L_{ANZ}$;

means for energizing the polyphase reversible stepping motor with a working voltage $U_{AR}$ which is greater than a design voltage $U_{AU}$ of the polyphase reversible stepping motor and corresponding to the drive power of the centrally operable unit; and a computer (which can be the computer of the central lock unit) controlling the polyphase reversible stepping motor and provided with position-monitoring means for monitoring a position of at least one of the elements as a motor-stepping monitor.

The invention is based upon the fact that the electric motor for operating the centrally-operable unit of the door lock is not in fact operated continuously and is not in fact continuously energized. By using an electric stepping motor whose nominal or rated power $L_N$ is significantly lower than the drive power $L_{ANZ}$ of the centrally-operable unit which must be actuated thereby, it is possible, by applying a higher voltage than the design voltage to step that motor. In that sense, the motor is subjected to so-called overpower energization.

Since the polyphase stepping motor used in accordance with the invention, and the step-monitoring system thereof is controlled with the aid of a computer, the blockage current peaks which arise in the case of DC motors, do not develop here. The computer controls the stepping motor and can be so arranged that the stepping motor is not subjected to deterioration because of the overpowering. For example, the computer can impose a forced pause on the operation of the stepping motor when overheating is about to occur. This represents a safety factor which is not provided in conventional door locks.

According to a feature of the invention, the polyphase stepping motor is equipped with an operating temperature monitor which cuts out the polyphase stepping motor when the temperature exceeds a limiting temperature above which overheating can be assumed to occur.

The polyphase stepping motor is preferably a permanent magnet motor operating in accordance with the jaw or claw principle. Such permanent magnet motors are known (See the company brochure SAIA AG, CH-3820 Murten, Switzerland, Publication No. 17/21 D1 dated prior to 1995 and EP 0 654 892 Al). All conventional systems for generating high positional precision and to avoid step loss can be used with such stepping motors. I can utilize limit switches or sensors to detect the positions of the various elements although I prefer to obtain the respective positions utilizing the step control of the stepping motor itself.

The stepping motor is preferably provided with a speed-reducing transmission so that it can operate with minimum current flow. The attainment of any position can then be represented by a determination of how long the current flows with a high degree of precision.

The polyphase stepping motor can be integrated in a system utilizing multiplex transmissions from and to a central unit of the lock system, e.g. as described in DE 44 27 253. When a central lock system utilizes the door locks of the invention provided with the polyphase stepping motor as has been described, a central diagnostic system for maintenance of the vehicle can be integrated with the lock system. Such polyphase stepping motors are usually operable over the full voltage range (6 to 16 volts) of modern motor vehicles and can have the same actuation times within this entire voltage range while ensuring clean braking at the end of each actuation to ensure that a certain position is obtained.

In general terms, the drive power $L_{ANZ}$ of the centrally-operable lock element can be significantly greater than the nominal or rated power $L_N$. Preferably the temperature monitor uses an up/down counter for the current flow during energization which counts up while current is flowing and counts down in the absence of current flow, effecting a forced pause on the motor when necessary. The step monitoring can use a measurement of the current during the energization phase and can operate by interrogating the nonenergized stator windings.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
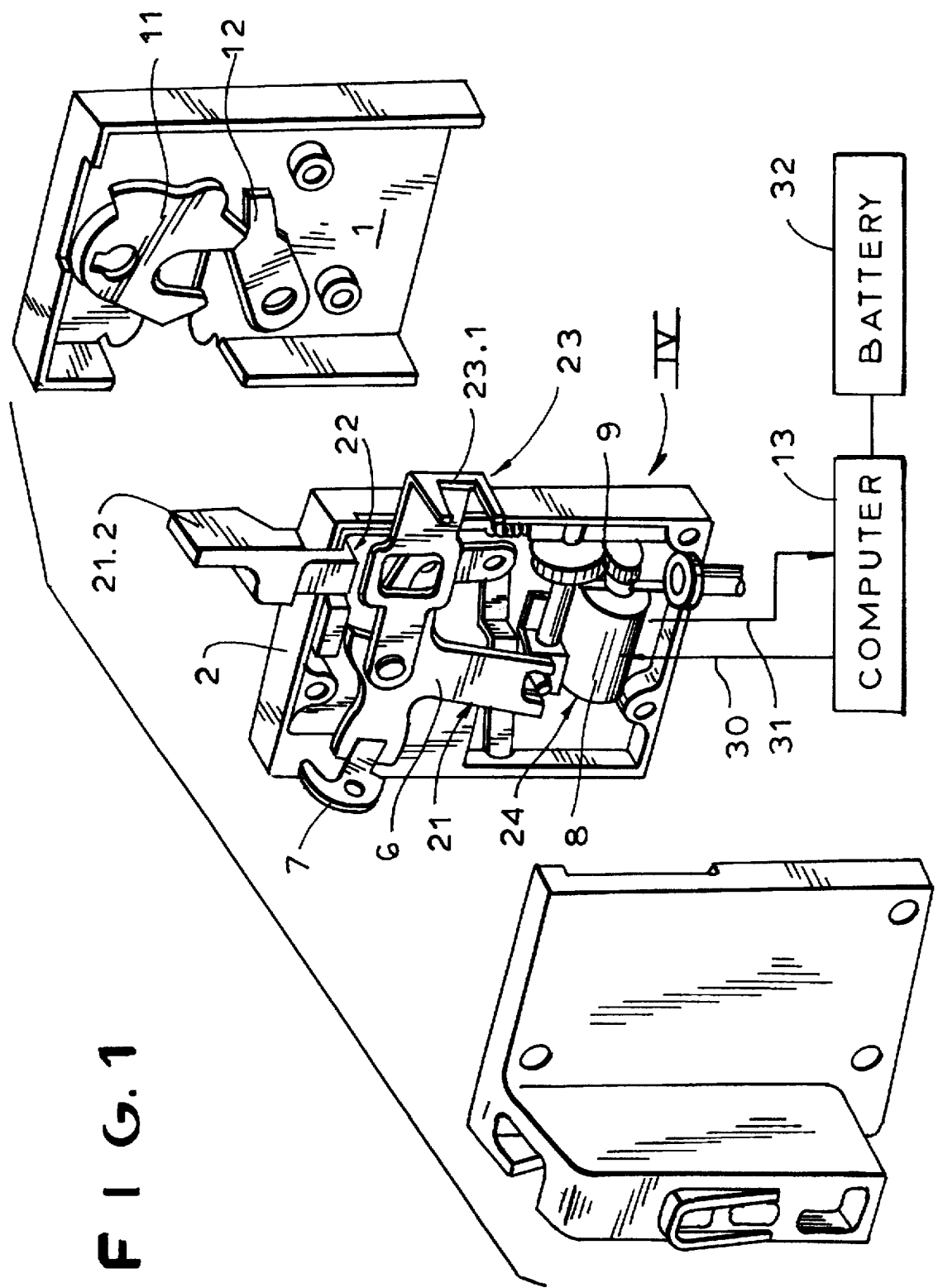
FIG. 1 is an exploded view showing the three main components of a door latch assembly for a motor vehicle, it being understood that the motor thereof is operated from a computer of a central lock system, that the position monitoring elements of the lock-feed position signals to this computer and that the power for the motor derives from the motor vehicle battery.
Figure 2:
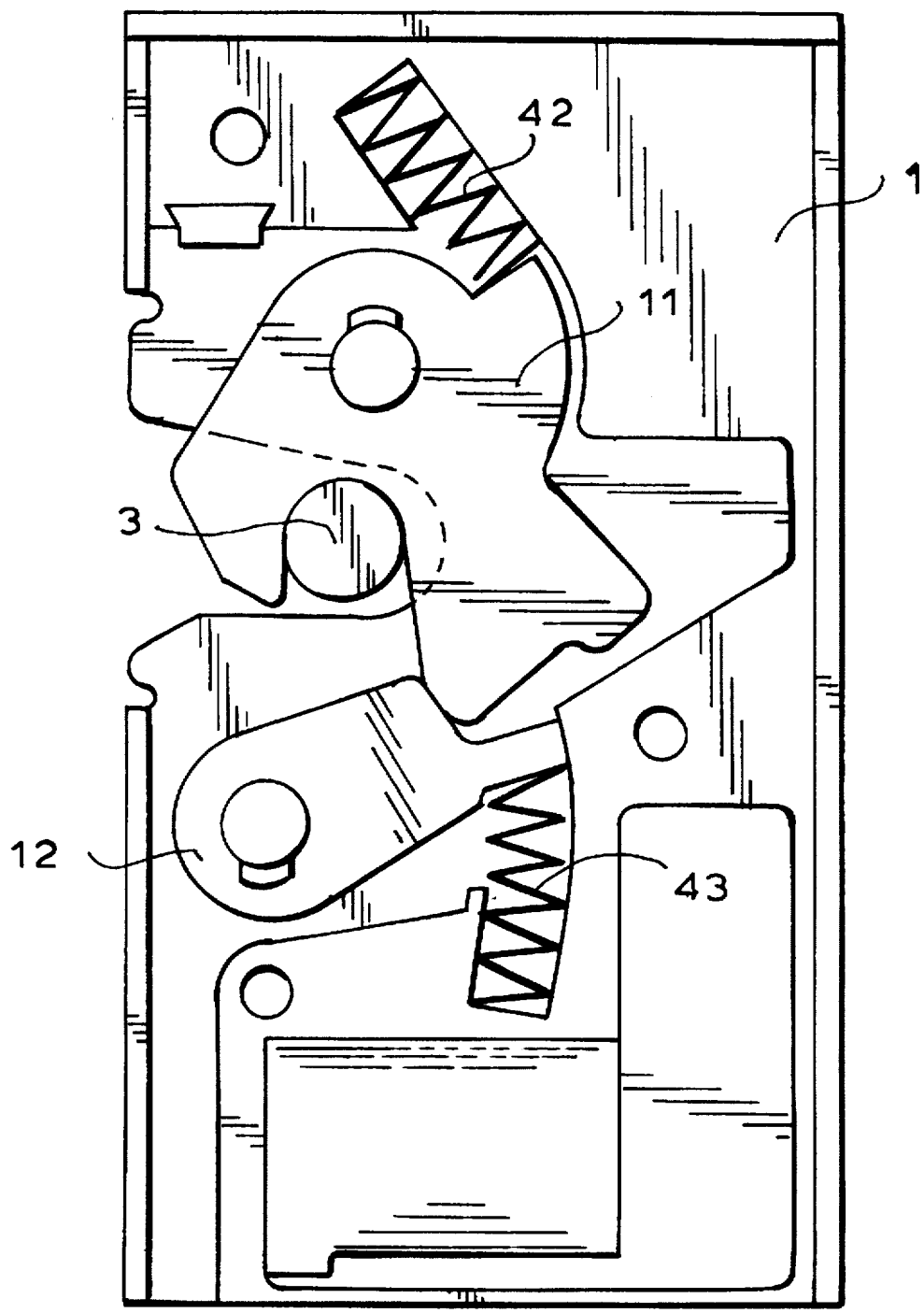
FIG. 2 is an elevational view of the closure elements of the assembly showing the engagement of these closure elements with a door pin and illustrating additional parts of the closure element component.

FIGS. 1–4 are directed to a door lock of the type which has been described in, for example, German patent 35 26 501 or the corresponding U.S. Pat. 4,735,447 and to which extent that any parts thereof have not been described here in detail, reference can be had to those patents for clarification, the lock of the invention operated in the manner described in U.S. Pat. 4,735,447. The invention is not however limited to this specific type of motor vehicle door lock.

Basically the lock comprises a closure component 1 having a rotary bolt 11 and a keeper 12. The bolt, in turn, is actuated by the locking element assembly 21 of the locking component 2 which also is provided with an actuating element assembly 22 and 23 which utilizes opening actuating elements 22 and securing actuating elements 23. A centrally operable unit 24 is provided which can include a motor 8 connected as has been diagrammatically represented by the arrow 30 to the computer 13 to be described in greater detail. Arrow 31 represents the supply of information from position-monitoring elements of component 2 to the computer 13 which can also receive an input from a remote control unit or key-lock system which can command the opening of the door lock. The vehicle battery is represented at 32 and is connected to the computer 13 and via the computer 13 to the motor 8. The computer forms part of a central lock unit which can operate all of the door locks of the vehicle in response to a remote control signal, key or switch operation.

Figure 3:
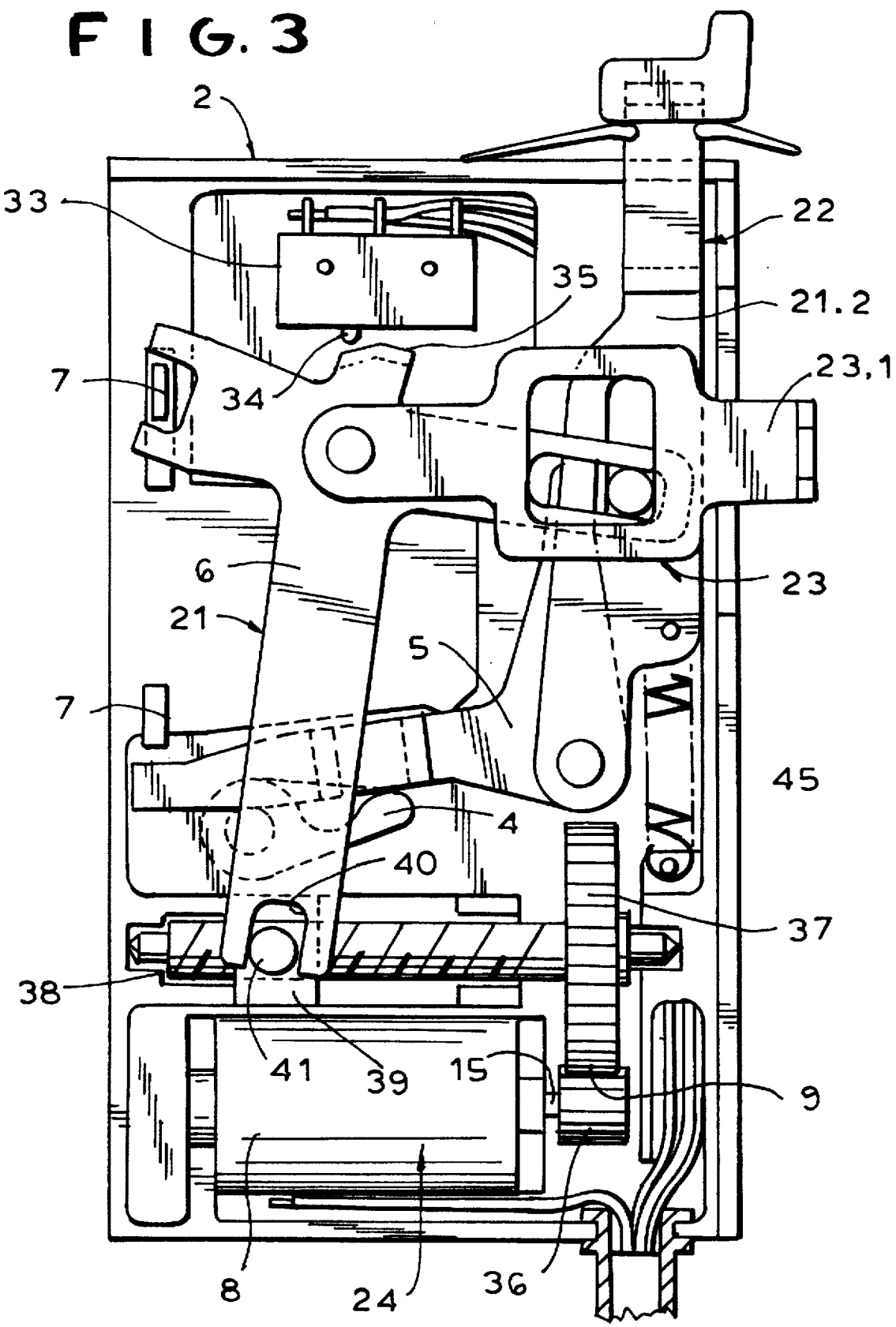
FIG. 3 is an elevational view of the locking component.
Figure 4:
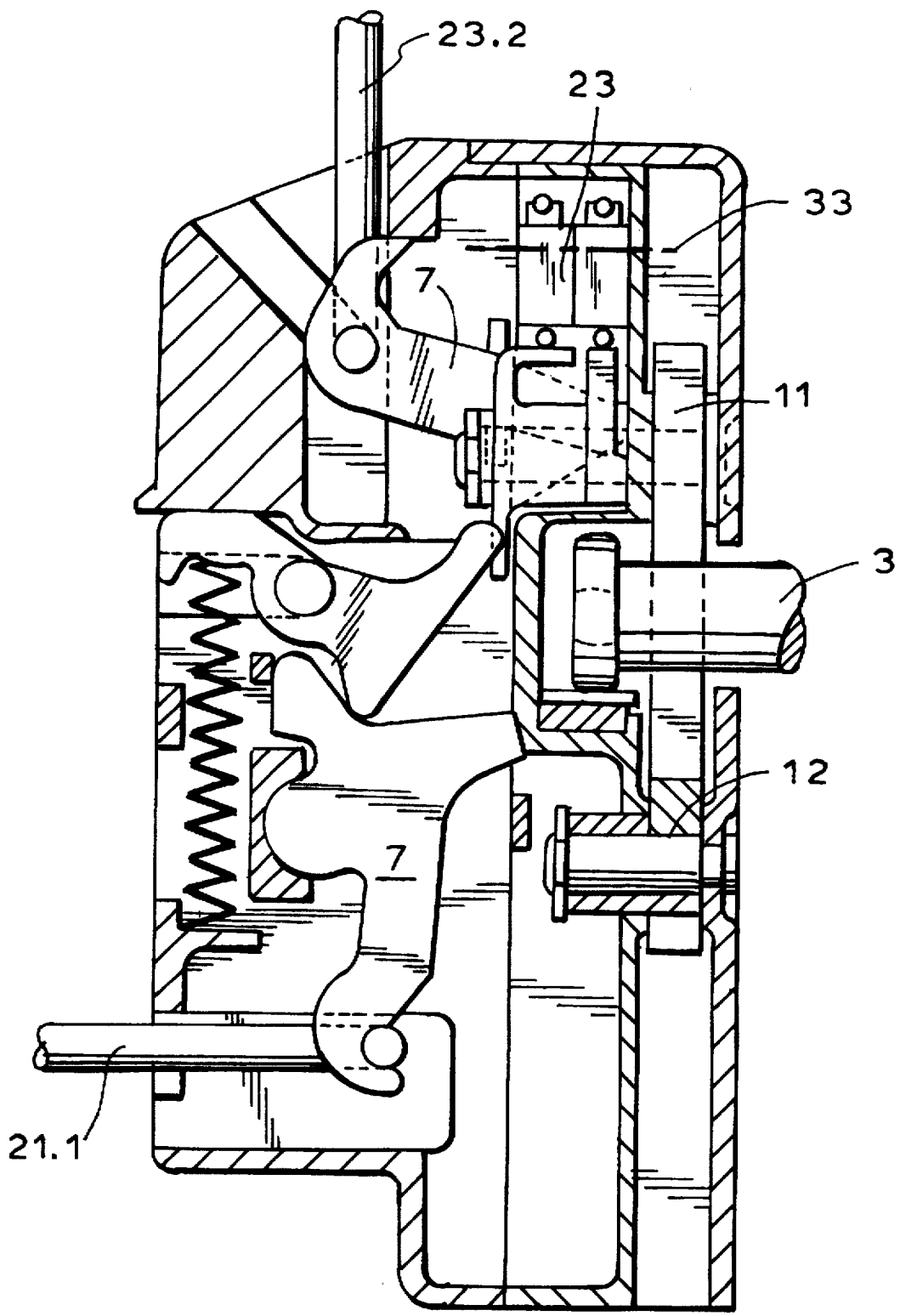
FIG. 4 is a cross sectional view through the lock as viewed in the direction of arrow IV of FIG. 1.

From FIG. 3 the differentiation between the locking elements 21 actuating the bolt 11 and the opening actuating elements 22 and securing actuating elements 23 will also be apparent and the manner in which the motor 8 drives the locking elements 21 is also clearly visible. A sensitive switch 33 can be operated by ramps 34 and 35 and lever 6 to provide the signals which are transmitted along line 31 to the computer.

FIG. 3 also shows that the motor 8, operating through a speed-reducing gearing or transmission 14 (FIG. 5) has a shaft 15 driving the gearing 9 consisting of a pinion 36 and a driven gear 37. The latter is connected to a threaded spindle 38 having a nut 39 slidable along the spindle. A fork 40 of the long arm of lever 6 engages a pin 41 on the nut so that the lever 6 can be rotated. The centrally operable unit 27 thus comprises the motor 8 and the train of mechanisms driven thereby including the securing element or main element 6 which shifts modes between the antitheft and nonantitheft modes.

The bolt 11 is biased in the clockwise sense by a compression spring 42 while the keeper 12 is biased in the counterclockwise sense by a compression spring 43.

The actuating elements and the securing elements themselves can be differentiated between subgroup and opening actuation elements as has been described in the art.

According to the invention, the lock can be operated by the computer 13 via the motor 8 which is a polyphase stepping motor. When the vehicle door is closed, the door lock forms a formfitting engagement of the closure elements 11, 12 with the closing pin 3 as can be seen from FIG. 2. For opening of the vehicle door, this formfitting connection is released by operation of the unit 21.

The opening actuating unit 21 allows the keeper 12 to withdraw from engagement with the bolt 11 upon a manual actuation of the internal or external opening button or lever. In the embodiment shown, the opening actuating elements 21 of the components 21.1 and 21.2 as can be seen from FIGS. 3 and 4. To release the keeper 12 from the bolt 11 and to allow opening of the door lock, a lever mechanism is provided which utilizes the external actuating lever 21.2 or the internal actuating rod 21.1 and also enables the release lever 4 to operate upon the keeper 12. This lever mechanism includes the actuating lever 5 which is visible in FIG. 3. The actuating lever 5 forms the most important element of the opening lever system. The lever 5 is fulcrumed on a pin 45.

The securing actuating elements 23 serve to render the opening actuating elements 21 of a subgroup ineffective when the door lock is to be secured. In the example, the securing actuating elements 23 have a closing cylinder connecting lever 23.1 and an internal securing rod 23.2 (compare FIGS. 3 and 4).

To inactivate the opening actuating element 21, a lever mechanism is provided which on the one hand is connected with the closing cylinder connecting lever 23.1 and with the internal securing rod 23.2 and, on the other hand, relieves the force transmission between the outer actuating lever 21.2 and the actuating lever 5. In this embodiment, moreover, the main element or lever 6 which is in force-transmitting relationship with the closing cylinder connecting lever 23.1 is also connected in force-transmitting relationship with one of the inner securing rods 23.2 via the second coupling element 7 (see FIGS. 3 and 4). The lever 6 forms the central element of the securing lever system.

It will be understood that back doors of a motor vehicle in general need not be provided with such a cylinder and need not have a motor vehicle door latch having a closing cylinder connecting lever. The central locking device serves for the remote-controlled electrical actuation of the securing element 23.

In this embodiment, moreover, the electric motor and the transmission 9 are matched to one another with a drive element of the transmission 9 arranged to swing the lever 6. The securing actuating element 23 is then placed in the secured position in the end secured position (compare FIG. 4).

According to the invention, the electric motor 8 which can be operated in response to a remotely-generated signal, e.g. by the key or switch unit 16 or from a central lock unit of a central lock system of which the door lock is a part, is a reversible polyphase stepping motor having a phase-forming stator winding. The polyphase stepping motor 8 has, when continuously energized, a certain nominal power or rated power $L_N$ at its output. By comparison, the lever 6 which forms part of the centrally-operable lock unit is designed to require a drive power $L_{ANZ}$ which is greater than the nominal rated power of the polyphase stepping motor ($L_N$ is smaller than $L_{ANZ}$).

The motor 8, moreover, is stepped by the application of a working voltage $U_{AR}$ thereto which is greater than the design voltage $U_{AU}$ which corresponds to the drive power of the centrally-operable locking device ($U_{AR}$ is greater than $U_{AU}$)

The polyphase stepping motor is equipped with an operating temperature monitor 10 which cuts out the polyphase stepping motor when the temperature of the working polyphase stepping motor exceeds a predetermined limiting temperature beyond which the motor can be considered to be overheating. This provides an overheating protection for the motor. For position monitoring, sensors such as sensitive switches or limit switches shown at 33, for example, in FIGS. 3 and 4 can be used and additional position monitoring can be effected by a step-monitoring device providing a feedback from a tachometer, e.g. as has been shown at 50 in FIG. 5 to the computer 13 which controls the stepping motor.

Figure 5:
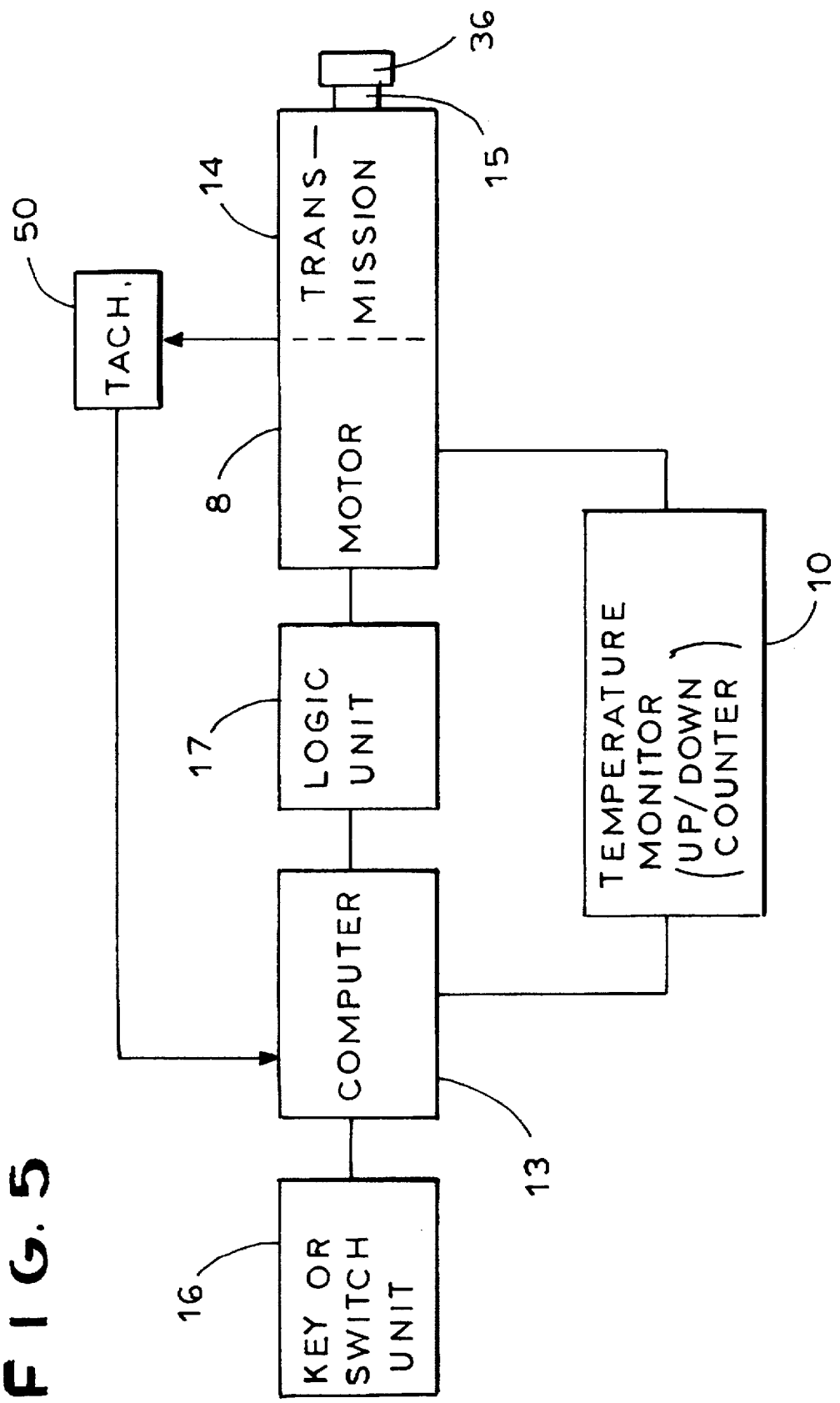
FIG. 5 is a block diagram of a door lock system according to the invention.

The block diagram of FIG. 5, therefore, makes clear how the position monitoring can be effected. The operation of the stepping motor can be initiated by a remote source such as the key or switching unit 16 which supplies its signal to the computer 13. The feedback path from the motor 8 to the computer is effected via a tachometer or other step monitor 50. Special limit switches or other sensors for monitoring the positions of the elements of the door lock can be avoided when this step-monitoring approach to detecting the positions of the lock elements is used.

In FIG. 5 it is also possible to see the speed-reducing transmission 14 and the drive 15 for the lock elements. The stepping motor 8 and the drive 15 are also visible in FIG. 3. The drive 15 operates as has been described upon the respective components of the door lock. The control from the key or switch 16 can be provided through a logic component.

Preferably the drive power $L_{ANZ}$ is at least 50% greater than the rated or nominal power $L_N$ of the polyphase stepping motor.

The temperature-monitoring unit 10 can include an up-down counter which counts up when there is a current flow to the polyphase stepping motor and counts down when the current supply to the stepping motor is cut off. This up-down counter can apply a forced pause to the operation of the stepping motor in the event of an overheating. The special monitoring itself may be accomplished via the tachometer by measuring current supplied to the polyphase stepping motor and interrogation of stator windings which are not currently energized.

I claim:

1. A motor-vehicle door lock comprising:
 - a closure-element component provided with a pivotable bolt engageable with a door-frame pin and a keeper for said bolt;
 - a locking-element component adjacent said closure-element component and operatively connected therewith;
 - an actuating-element component comprised of opening actuation elements and of a securing actuation element, at least one of said components being provided with a main element operable by a central lock unit;
 - a polyphase reversible stepping motor having a phase-conforming stator winding and provided with a step-down transmission operatively connected to said main element for operating same in response to a signal from a remote source said motor, said transmission and said main element forming a centrally operable unit,
 the polyphase reversible stepping motor being designed to have a certain nominal power $L_N$ at an output of said polyphase stepping motor under constant energization,
 the centrally operable unit being designed to have a required drive power $L_{ANZ}$ greater than said nominal power $L_N$ of said polyphase stepping motor whereby $L_N$ is less than $L_{ANZ}$;
 means for energizing said polyphase reversible stepping motor with a working voltage $U_{AR}$ which is greater than a design voltage $U_{AU}$ of said polyphase reversible stepping motor and corresponding to the drive power of the centrally operable unit; and
 a computer controlling said polyphase reversible stepping motor and provided with position-monitoring means for monitoring a position of at least one of said elements as a motor-stepping monitor.

2. A motor-vehicle door lock according to claim 1 wherein the polyphase reversible stepping motor is equipped with an operating temperature monitor for cutting out the polyphase stepping motor when the operating temperature thereof exceeds a predetermined limiting temperature above which overheating of the motor occurs.

3. A motor-vehicle door lock according to claim 1 wherein the drive power $L_{ANZ}$ of the centrally operable unit is at least 50% greater than the nominal power $L_N$ of the polyphase stepping moor.

4. A motor-vehicle door lock according to claim 2 wherein said operating temperature monitor includes an up/down counter counting up with current flow to the polyphase stepping motor and counting down in the absence of current flow through the motor and connected to apply a forced pause in the operation of the motor when required.

5. A motor-vehicle door lock according to claim 1 wherein said motor-stepping monitor includes means for measuring a drive current of the polyphase stepping motor and for checking stator windings which are not supplied with current.

* * * * *